United States Patent [19]

Ohmori

[11] Patent Number: 5,608,463
[45] Date of Patent: Mar. 4, 1997

[54] OSCILLATOR CIRCUIT SUITABLE FOR PICTURE-IN-PICTURE SYSTEM

[75] Inventor: Junichi Ohmori, Kanagawa, Japan

[73] Assignee: NEC Corporation, Tokyo, Japan

[21] Appl. No.: 111,898

[22] Filed: Aug. 26, 1993

[30] Foreign Application Priority Data

Aug. 26, 1992 [JP] Japan ................................ 4-227525

[51] Int. Cl.$^6$ ........................................ H04N 5/04
[52] U.S. Cl. ..................... 348/540; 348/536; 348/537
[58] Field of Search ........................ ; 331/20; 348/540, 348/536, 537, 538, 539, 541, 542, 543, 512, 521, 555, 556, 563, 564, 569, 545; 358/148, 155, 183; H04N 5/04

[56] References Cited

U.S. PATENT DOCUMENTS

| | | | |
|---|---|---|---|
| 3,821,470 | 6/1974 | Merrell | 348/540 |
| 4,251,833 | 2/1981 | Fernsler et al. | 348/545 |

FOREIGN PATENT DOCUMENTS

| | | | |
|---|---|---|---|
| 0479508 | 4/1992 | European Pat. Off. . | |
| 0553767 | 8/1993 | European Pat. Off. . | |
| 0097234 | 6/1982 | Japan | 358/158 |
| 0012691 | 1/1989 | Japan | 358/158 |
| 0207395 | 8/1993 | Japan | H04N 5/45 |

OTHER PUBLICATIONS

IEEE Transactions on Consumer Electronics, vol. 37, No. 3, Aug. 1991, pp. 313–318.
Patenet Abstract of Japan, vol. 16, No. 112 (E–1180), Mar. 19, 1992.
Patent Abstract of Japan, vol. 11, No. 231 (E–527), Jul. 28, 1987.
Patent Abstracts of Japan, vol. 15, No. 115 (P–1181), Mar. 19, 1991.
Patent Abstract of Japan, vol. 4, No. 79 (E–14), Apr. 4, 1980.

*Primary Examiner*—David E. Harvey
*Attorney, Agent, or Firm*—Sughrue, Mion, Zinn, Macpeak & Seas

[57] ABSTRACT

Disclosed herein is an oscillator circuit used for a PIP system which displays a child picture image without distortion even when the image method of the child picture image is different from that of a parent picture image. The oscillator circuit employed in such a system includes a programmable frequency divider for frequency dividing an output of a voltage-controlled oscillator with a frequency dividing ratio to produce a frequency-divided signal and a control circuit for controlling the oscillation frequency of the oscillator 201 according to a phase difference between the frequency-divided signal and a horizontal synchronizing signal. The frequency dividing ratio for the frequency divider is changed according to the image method of the child picture image.

4 Claims, 7 Drawing Sheets

800
801(NTSC)
802(NTSC)

800
801(NTSC)
803(PAL)

800
801(NTSC)
804(PAL)

800
811(PAL)
812(PAL)

800
811(PAL)
813(NTSC)

800
811(NTSC)
814(PAL)

OSCILLATOR CIRCUIT SUITABLE FOR PICTURE-IN-PICTURE SYSTEM

BACKGROUND OF THE INVENTION

The present invention relates to an oscillator circuit and, more particularly, to an oscillator circuit suitable to use in a picture-in-picture (PIP) system for displaying, on a common display screen, a first picture image (referred to as a "parent picture image" hereinafter) and a second picture image (referred to as a "child picture image" hereinafter).

A PIP system is for displaying, both a parent picture image and a child picture image on a common display screen and is commercially put into a practical use as a television set equipped with a PIP function. Since the child picture image is displayed on a limited portion of the display screen in lieu of the corresponding portion of the parent picture image, the child picture image to be displayed is derived by compressing an original child picture image.

In the case where the original child picture image, which is generated by the NTSC method having 262.5 horizontal scan lines per 1 field (1 screen), is compressed to, for example, one-third, it is necessary to derive image information of about 87 scan lines from image information of 262.5 lines. The child picture image thus compressed is further required to be displayed on a predetermined position on the display screen.

For these purposes, the original picture image is sampled in synchronism with a clock signal having a sampling rate corresponding to the required compressibility. The image information thus sampled is converted into digital data which are in turn temporarily stored in a memory. The reading-out operation digital data thus stored is initiated at a time point at which a scanning in a display device (CRT) proceeds to the position of the display screen on which the child screen image is to be displayed. The read-out data are then converted into an analog signal in synchronism with a clock signal having the same rate as the sampling rate. The compressed child picture image is thus produced and supplied to the display device.

When a picture image from a broadcasting station is selected as a child picture image, the image method thereof is the same as that of a parent picture image. That is, in a television set used in Japan or the United States, the parent and child picture images is generated by the NTSC method. In a television set used in European countries, on the other hand, they are of a PAL method.

A video signal from a VTR, that is, a picture image recorded on a video tape is sometimes used as the child picture image, however, in this case, the picture image may be recorded in NTSC or PAL method that is different from the parent picture image.

Since the PAL system having 312.5 horizontal scan lines per 1 field, an image obtained by compressing a PAL method image to one-third required image information of about 104 scan lines.

It is usual that the internal construction of the television set having the PIP system is primarily determined to accommodate to the NTSC method in Japan or the United States or the PAL method in Europe. That is, the sampling rate for compressing the original child picture image is determined and fixed in accordance with the image method of the television set. For this reason, when the child picture image of the PAL method is displayed on a television set of the NTSC system, the displayed child screen image is vertically reduced. This phenomenon will be described in detail with reference to FIGS. 7 and 8.

FIG. 7 illustrates an example in which the PIP system is incorporated in a television set of the NTSC method. A parent picture image 801 is displayed on a display screen 800 according to the NTSC method. A child picture image 802 is displayed on a predetermined position on the display screen 800. Assuming that the child picture image 802 is of the NTSC method, since both of the parent and child picture images 801 and 802 are of the same image method, a circle as the child picture image 802 is displayed as it is without a substantial deformation, as shown in FIG. 7(a). On the other hand, when the child picture image is of the PAL method, the compressed picture image actually has the image information of 104 scan lines in spite of a fact that the compressed picture image has only to have the image information of 87 scan lines. As a result, the circle as the child screen image 803 is displayed with a vertically reduced ellipse, as shown in FIG. 7(b).

On the other hand, in a television of the PAL system, a circle as the child picture image 812 of the PAL method is displayed as it is, as shown in FIG. 8(a). However, when the child picture image of the NTSC method is displayed, the compressed image thereof actually has image information of 104 scan lines while it is required to have images information of 87 scan lines. As a result, a circle as the compressed child picture image 813 is actually displayed with a vertically expanded ellipse, as shown in FIG. 8(b).

Thus, if the video method of the child picture image is different from that of the parent picture image, the child picture image is actually displayed in the screen with distortion.

SUMMARY OF THE INVENTION

A primary object of the present invention is, therefore, to provide an oscillator circuit used for a PIP system which displays a child picture image without distortion or with sufficiently reduced distortion even when a parent picture image is of a different image method.

Another object of the present invention is to provide an oscillator circuit capable of generating a clock signal which is optimum for use in such a PIP system.

The distortion of the actually-displayed child picture image can be removed by controlling a sampling rate for sampling and A/D converting the original child picture image for compression or controlling a sampling rate for reading the data from a memory and converting it into analog information. For example, in the case where a child picture image of the PAL method is required to be displayed on a screen of a television set of the TSC method, the frequency of a clock signal is changed to becomes higher. As a result, the child picture image displayed on the screen is reduced horizontally to some extent, resulting in that the child picture image is displayed without a substantial distortion as a whole.

From the stand of view mentioned above, an oscillator circuit according to the present invention comprises a controlled oscillator producing a clock signal having a frequency varied in response to a control signal, a programmable frequency divider for generating a frequency dividing signal having frequency of a horizontal synchronizing signal by dividing frequency of the oscillation signal from the oscillator with a programmable frequency dividing ratio, and a control circuit responsive to the frequency dividing signal from the frequency divider and the horizontal synchronizing signal for controlling the control signal according to a phase difference between the signals.

Thus, by changing the frequency dividing ratio to be set in the programmable frequency divider according to the image method of the child picture image with respect to that of the parent picture image, a clock signal having a frequency necessary to display a compressed child picture image without distortion is obtained.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 6:
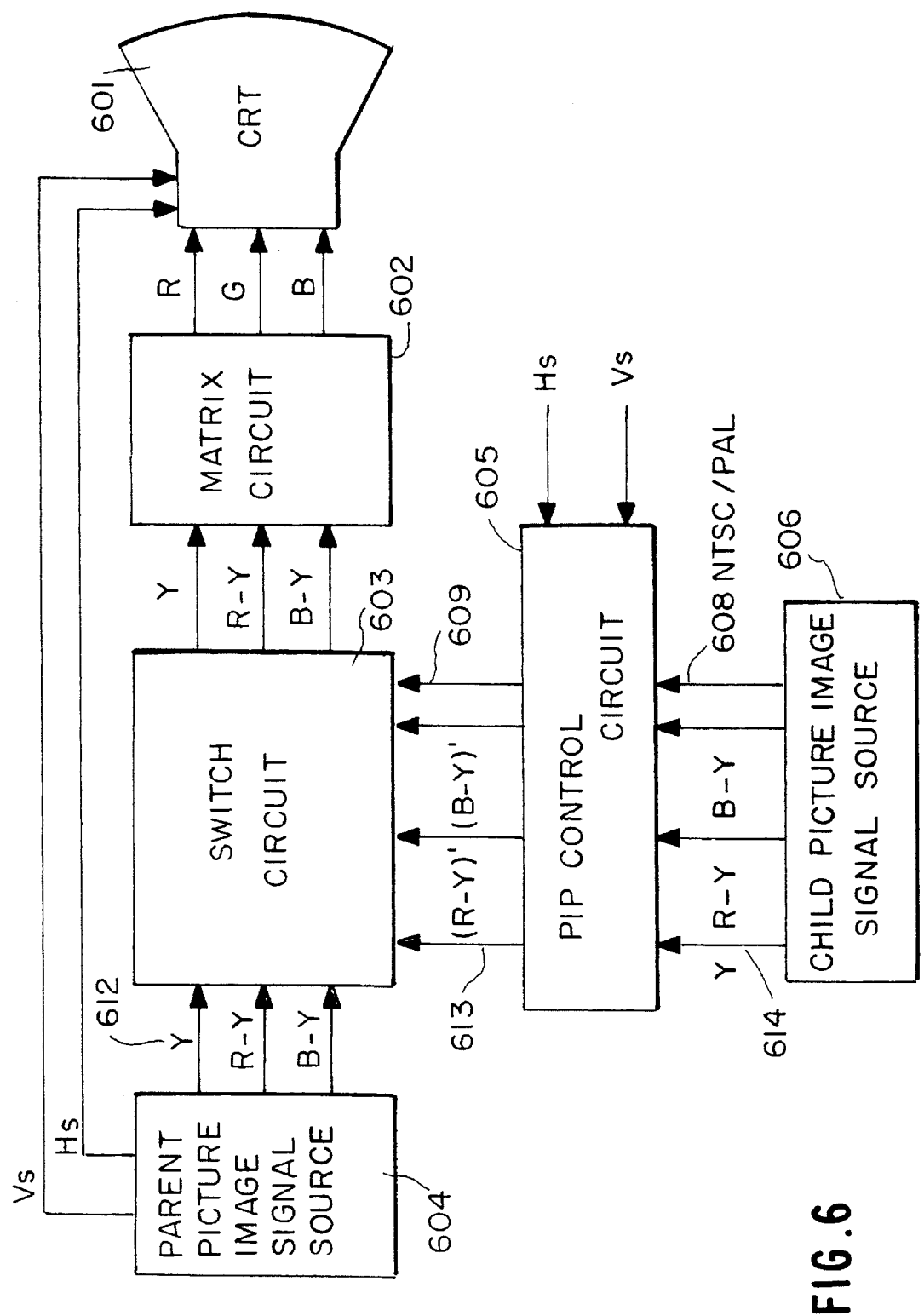
FIG. 6 is a block circuit diagram of a television set equipped with a PIP function.

Before describing embodiments of the present invention in detail, a television set having PIP function will be described below with reference to FIG. 6 in order to facilitate the understanding of the present invention.

This television set includes a parent picture image signal source 604. Thus source 604 represents a tuner of the television set and a video signal processing thereof and generates parent picture image signal information 612 composed of a luminance signal Y and two color difference signals R-Y and B-Y. This information 612 is supplied to a switch circuit 603.

The set further includes a child picture image signal source 606 which generates original child picture image information 614 composed of a luminance signal Y and two color difference signals R-Y and B-Y in accordance with a video signal from a broadcasting station or a VTR (not shown) and supplies it to a PIP control circuit 605. The child picture image signal source 606 supplies the circuit 605 with an NTSC/PAL signal 608 indicative of whether the child picture image is of the NTSC method or the PAL method. The control circuit 605 is further supplied with a horizontal synchronizing signal Hs and a vertical synchronizing signal Vs from the parent picture image signal source 604. The PIP control circuit 605 thus compresses the original child picture image information 614 to produce compressed child picture image information 613 composed of a luminance signal Y' and two color difference signals (R-Y)' and (B-Y)', which is in turn supplied to the switch circuit 608. The control circuit 605 further generates a switch control signal 609 in accordance with a display position of the child picture image and supplies it to the switch circuit 603.

The switch circuit 603 selects and outputs the parent picture image information 612 when the control signal 609 is in an inactive level and selects and outputs the compressed child picture image signal 613 when it is in active level. Video information 611 outputted from the switch circuit 603 is supplied to a matrix circuit 602 which thus generates three primary color signals 610, R, G and B. These signals 610 are supplied to a cathod ray tube (CRT) 601 which is further supplied with the horizontal and vertical synchronizing signals Hs and Vs. Thus, both the parent picture image and the child picture image are displayed on a screen of the CRT 601.

Figure 1:
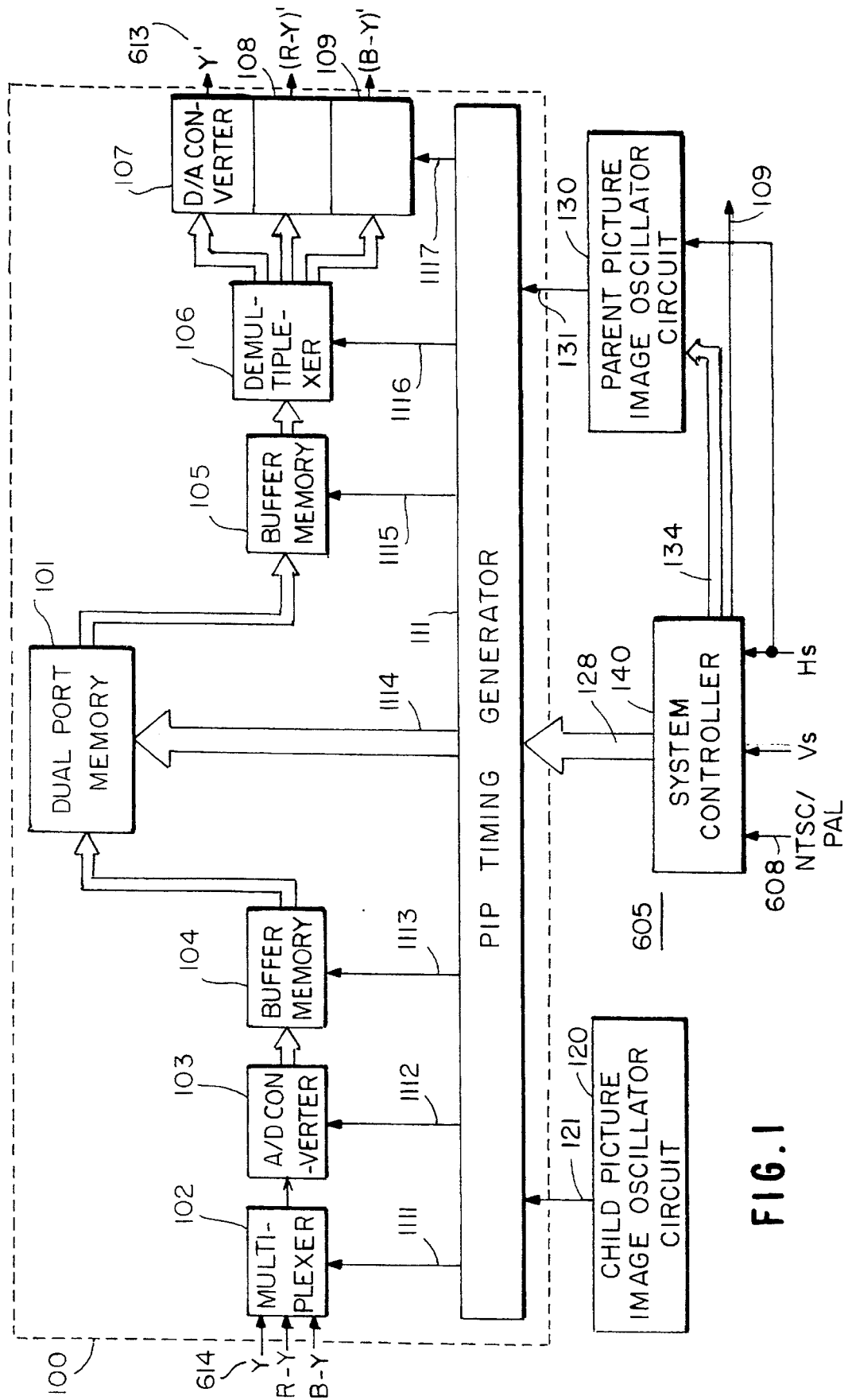
FIG. 1 is a block circuit diagram of a PIP system according to an embodiment of the present invention.

Referring to FIG. 1, the PIP control circuit 605 includes a video compression circuit 100 for compressing the child picture image, a system controller 140, a child picture image oscillator circuit 120 and a parent picture image oscillator circuit 130. In this embodiment, the parent picture image oscillator circuit 130 is constructed to generate a clock signal 131 having a variable frequency in accordance with the present invention. The frequency of a clock signal 121 from the child picture image oscillator circuit 120 is fixed to a constant value. In this embodiment, moreover, the television set is of the NTSC system, and therefore the frequency of the clock signal 121 from the oscillator circuit 120 is designed to be 18 MHz.

The system controller 140 generates the switch control signals 609 to be supplied to the switch circuit 603 (FIG. 6) in response to the horizontal and vertical synchronizing signals Hs and Vs and further generates an oscillation frequency control data 134 to be supplied to the oscillator circuit 130 in response to a level of the NTSC/PAL signal 608. In this embodiment, the NTSC/PAL signal 608 takes a high level when the child picture image is of the NTSC method and a low level when it is of the PAL method. The controller 140 further generates a compression command information 128 to be supplied to the compression circuit 100.

The compression circuit 100 includes a multiplexer 102 supplied with the child picture image information 614. The multiplexer 102 samples and outputs the luminance signal Y and the color difference signals R-Y and B-Y of the information 614 in sequence in response to a sampling signal 1111 which is generated by a PIP timing generator 111 on the basis of the clock signal 121 from the oscillator circuit 120.

An output of the multiplexer 102 is converted by an A/D converter 103 into digital data and then temporarily stored in a buffer memory 104. The conversion rate of an A/D conversion timing signal 1112 for the converter 103 and the rate of a read/write signal 1113 for the memory 104 generated from the PIP timing generator 111 are also 18 MHz.

When the image or video data corresponding to one horizontal scan line of the child picture image are stored in the buffer memory 104, that data are then transferred to and written in a dual port memory 101. To this end, the PIP timing generator 111 generates memory control data 1114 including a write address and a write clock signal and supplies it to the memory 101. The child picture image information 614 is thus compressed to one-third and the digital data corresponding to the compressed video information are stored in the memory 101.

On the other hand, the parent picture image information 612 (FIG. 6) is supplied through the switch circuit 603 and the matrix circuit 602 to the CRT 601 and thus displayed on the screen thereof during the compression process of the child picture image in the PIP control circuit 605. When the system controller 140 detects, in response to the horizontal and vertical synchronizing signals Hs and Vs, the fact that a raster scan in the CRT 601 reaches a child picture image display position, it outputs the PIP timing generator 111 with a command indicative of the output of the compressed child picture image information as the control data 128. In response thereto, the PIP timing generator 111 initiates a data read operation to read the data out of the memory 101 by use of the memory control data 1114. At this time, the control data 1114 includes a read address and a read clock signal. As is well known in the art, the dual port memory 101 has a line buffer (not shown) which temporarily stores data of a row selected by the read address. The data stored in the line buffer are outputted therefrom in synchronism with the read clock signal contained in the control data 1114 every a predetermined number of bits. The data thus read out are then written in a buffer memory 105 under the control of a read/write signal 1115. The read clock signal in the data 1114 and the read/write signal 1115 are generated based upon the clock signal 131 from the oscillator circuit 130.

When the child picture image is of the NTSC method, the NTSC/PAL signal 608 from the source 606 (FIG. 6) is at the high level, the controller 140 outputs such a control data 134 that causes the oscillator circuit 130 to generate the clock signal 131 having a frequency of 18 MHz. Therefore, a data read rate of the data from the memory 101 is also 18 MHz. The read/write signal 1115 also takes a frequency of 18 MHz.

Upon completion of the write operation of the data corresponding to one scan line in the buffer memory 105, the data are them read sequentially therefrom by the read/write signal 1115 and supplied to a demultiplexer 106. This demultiplexer 106 transfers the luminance data Y and the color difference data R-Y and B-Y to D-A converters 107, 108 and 109, respectively, on the basis of a selection timing signal 1116. In response to a conversion timing signal 1117 having a rate of 18 MHz, the D/A converters 107, 108 and 109 convert the respective input digital data into analog signals. The compressed child picture image information (Y', (R-Y)' and (B-Y)') 613 is thus produced and supplied to the switch circuit 603 (FIG. 6).

The switch circuit 603 selects and outputs the child picture image signal 613 in response to the active level of the switch signal 609 from the controller 140. As a result, the child picture image is displayed at the predetermined position on the display screen of the CRT 601.

Figure 7A:
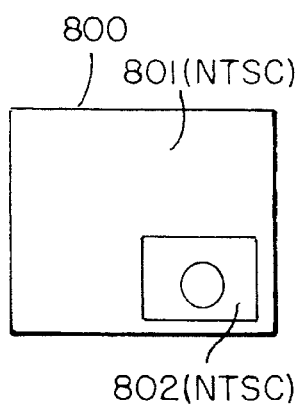
FIGS. 7(a) to (c) illustrated situations where a child picture images of the PAL and NTSC methods are displayed on a parent picture image of the NTSC method.
Figure 7B:
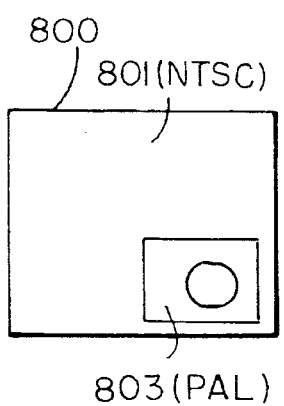

In the present explanation, since both the parent and child picture images are of the NTSC method, the picture image displayed on the CRT 601 is represented as shown in FIG. 7(a).

Figure 7C:
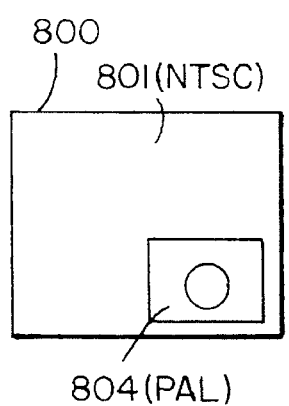

On the other hand, in the case where the child picture image 614 is of the PAL method, the NTSC/PAL signal 608 becomes the low level. Therefore, the controller 140 changes the oscillation frequency control data 134 to such a value that causes the frequency of the clock signal 131 from the oscillator circuit 130 to become high. In response to the clock signal 131 thus controlled, the rate of the data read operation from the dual port memory 101 becomes high and the rates of the timing signals 1115, 1116 and 1117 also become high. In this embodiment, the frequency of the signal 131 and so forth are changed to 21.4 MHz. As a result, the child picture image 804 actually displayed on the screen 800 is reduced in a horizontal direction. Accordingly, a circle indicative of the original child picture image is displayed as a substantial circle also in the actually-displayed compressed child picture image, as shown in FIG. 7(c).

Figure 8A:
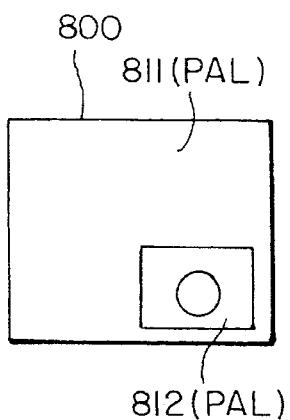
FIGS. 8(a) to (c) illustrated situations where child picture images of the PAL and NTSC methods are displayed on a parent picture image of PAL system.
Figure 8B:
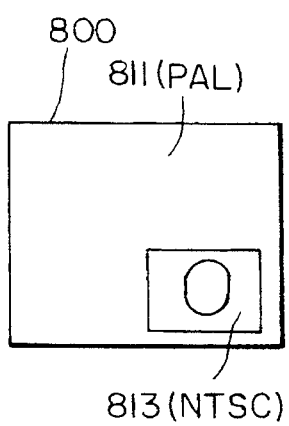
Figure 8C:
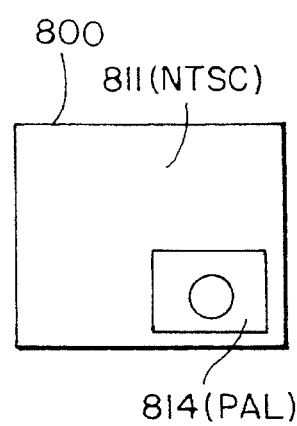

When the television set is designed to be for European countries, the frequency of the clock 121 of the child picture image oscillator 120 is set to 24.1 MHz. When this television set receives a child picture image of the PAL method, the controller 140 controls the oscillator 130 such that its output frequency becomes 24.1 MHz. Therefore, a display on the CRT 601 becomes as shown in FIG. 8(a). On the other hand, when a child picture image of the NTSC method is supplied thereto, the oscillator 130 is controlled such that the frequency of the clock signal 131 becomes to be 18 MHz. Thus, the horizontal synchronizing frequency is lowered on the CRT 601, upon which the child picture image 814 is expended horizontally, resulting in the display of a substantially circular child picture image, as shown in FIG. 8(c).

Alternatively, it is possible to keep the frequency of the clock signal 121 at 18 MHz. In this case, in response to the supply of the child picture image of the NTSC method, the frequency of the clock signal 131 is lowered from 18 MHz to 15.1 MHz. The substantially same effect as that shown in FIG. 8 can be obtained by this scheme.

Although, in the above description, the frequency of the output clock signal 131 of the oscillator circuit 130 is changed according to the image method of the child picture image, it is possible to change the frequency of the clock signal 121 from the oscillator circuit 120 while keeping the frequency of the clock signal 131 constant.

Figure 2A:
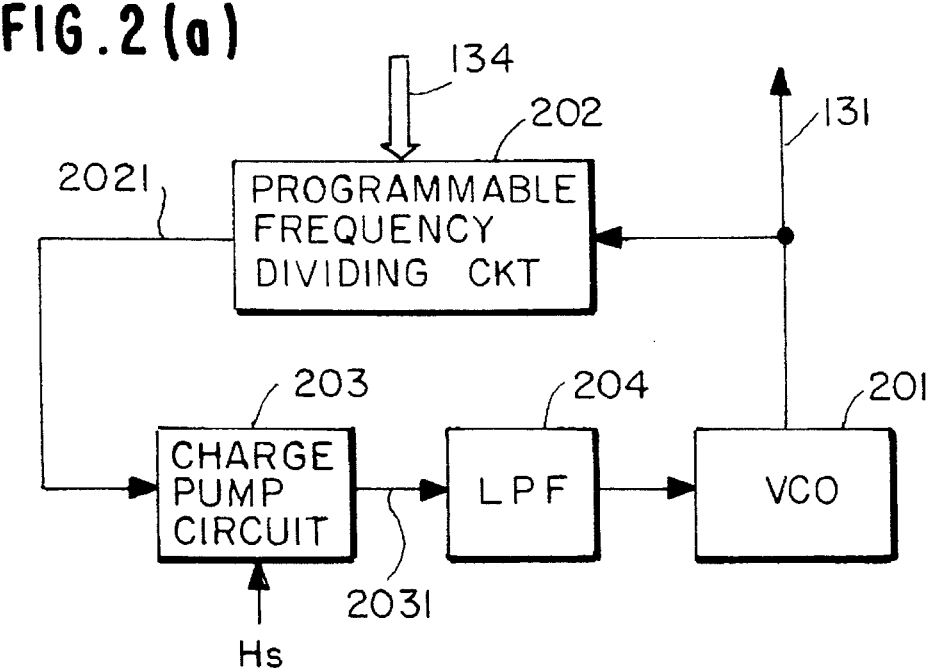
FIG. 2(a) is a block circuit diagram indicative of a parent picture image oscillator circuit shown in FIG. 1.

Turning to FIG. 2(a), the oscillator circuit 130 for the purpose described above is constituted by employing the PLL technique. More specifically, the circuit 130 includes a voltage-controlled oscillator (VCO) 201 generating the clock signal 131. The oscillation signal 131 is supplied to a programmable frequency divider circuit 202 and thus frequency-divided thereby. The controller 140 (FIG. 1) supplies frequency dividing ratio data to the programmable frequency divider circuit 202 as the oscillation control data 134. A frequency-divided signal 2021 is generated from the frequency divider circuit 202 and supplied to a charge pump circuit 203 which further receives the horizontal synchronizing signal Hs. The circuit 203 is activated only when the signal Hs indicates a horizontal flyback period and controls the charging or discharging of a low-pass-filter (LPF) 204. An output of the LPF 204 is supplied to the VCO 201 to control its oscillation frequency. The frequency of the clock signal 131 is thus controlled. In other words, the oscillation frequency of the VCO 201 is controlled in accordance with a difference in phase between the frequency-divided signal 2021 and the horizontal synchronizing signal Hs.

Figure 2B:
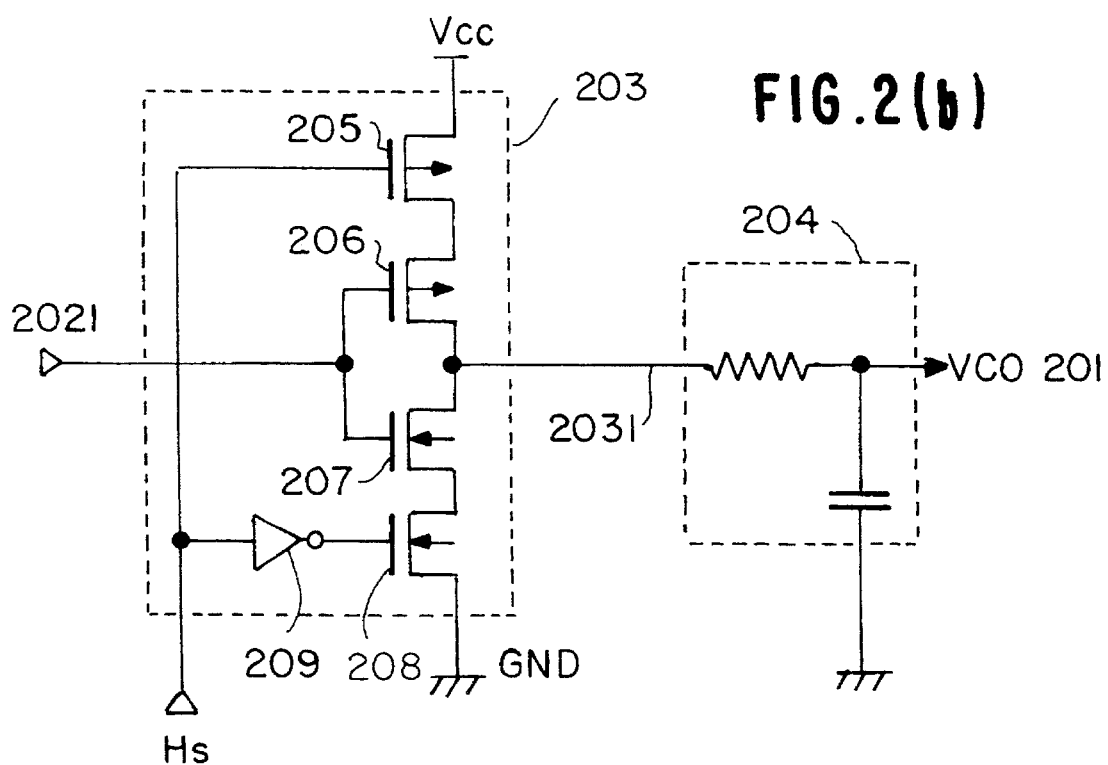
FIG. 2(b) is a circuit diagram indicative of a charge pump circuit and a low pass filter shown in FIG. 2(a)

Referring to FIG. 2(b), the charge pump circuit 203 includes P channel MOS transistors 205 and 206 and N channel MOS transistors 207 and 208, which are connected in series between a power supplied line Vcc and a ground line GND. The gates of the transistors 206 and 207 are supplied in common with the frequency-divided signal 2021. The horizontal synchronizing signal Hs is supplied to the gate of the transistor 205 and further to the gate of the transistor 208 through an inverter 209. The drains of the transistors 206 and 207 are connected in common to produce the output 2031 of the circuit 203. This output 2031 is supplied to the LPF 204 composed of a resistor 210 and a capacitor 211. The charge pump circuit 203 is constituted by a clocked inverter in other words.

Figure 3:
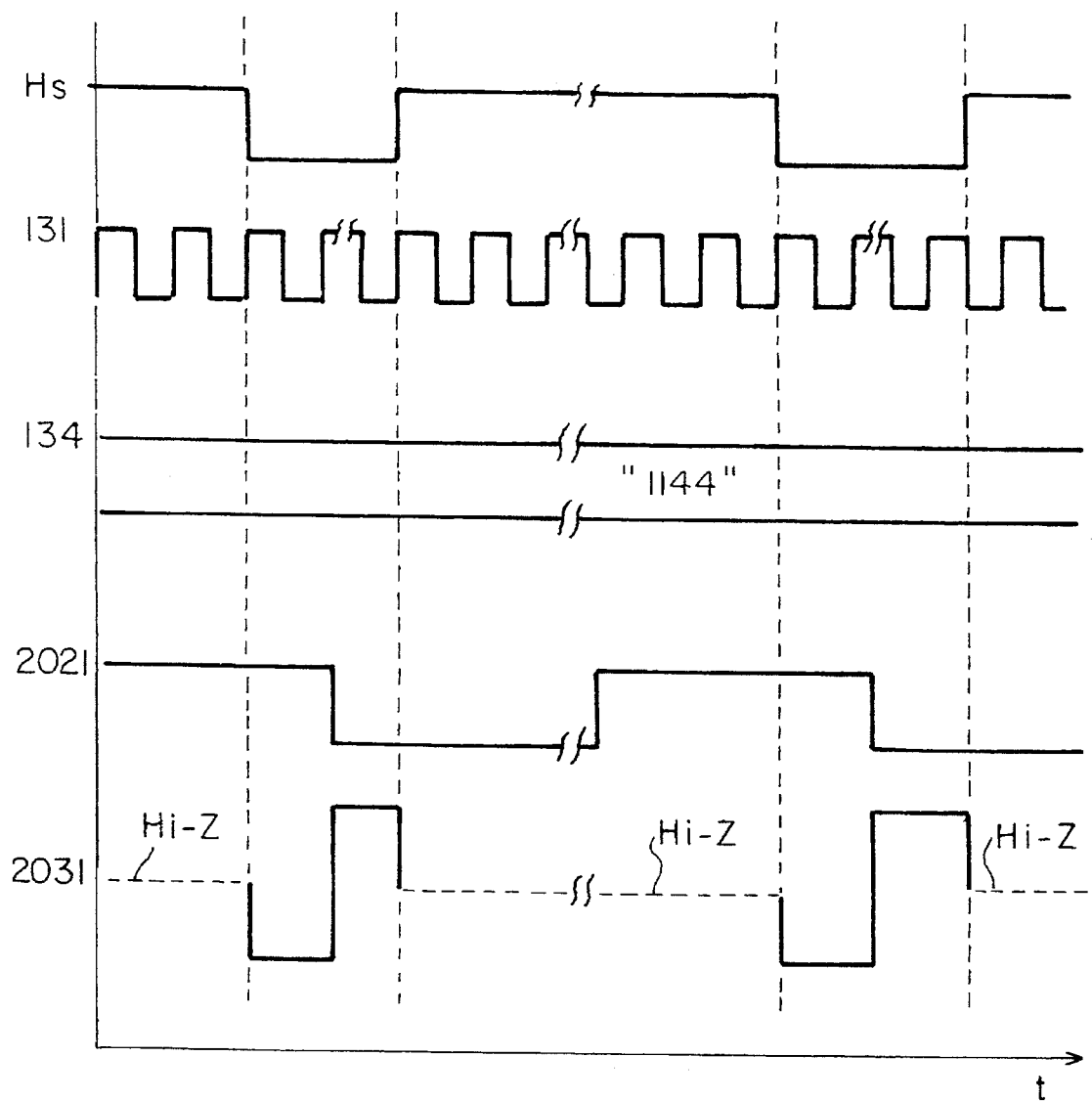
FIG. 3 is a timing chart showing an operation of the circuit shown in FIG. 2 when frequency driving ratio is constant.

The programmable frequency divider circuit 202 divides the clock signal 131 from the VCO 201 on the basis of the frequency dividing ratio data 134 such that the frequency-divided signal 2021 has the same frequency as that of the horizontal synchronizing signal Hs. FIG. 3 shows a timing chart obtained when the controller 140 sets a frequency dividing ratio data (1144) necessary to obtain the clock signal 131 of 18 MHz corresponding to the child picture image of the NTSC method. The VCO 204 oscillates at 18 MHz correspondingly. Specifically, a phase synchronizing loop is established such that the level-inversion edge of the frequency-divided signal 2021 appears at a center of the low level period of the horizontal synchronizing signal Hs, the low level period corresponding to the horizontal flyback period. Therefore, the charging and discharging currents supplied to the LPF 204 during the low level period of the horizontal synchronizing signal Hs become equal to each other. On the other hand, the output 2031 of the circuit 203 during the high level period of the signal Hs is brought into a high impedance, since the transistors 205 and 208 are rendered nonconductive. As a result, the output voltage level of the LPF 204 is kept constant to allow the VCO 201 to continue to oscillate at 18 MHz.

Figure 4:
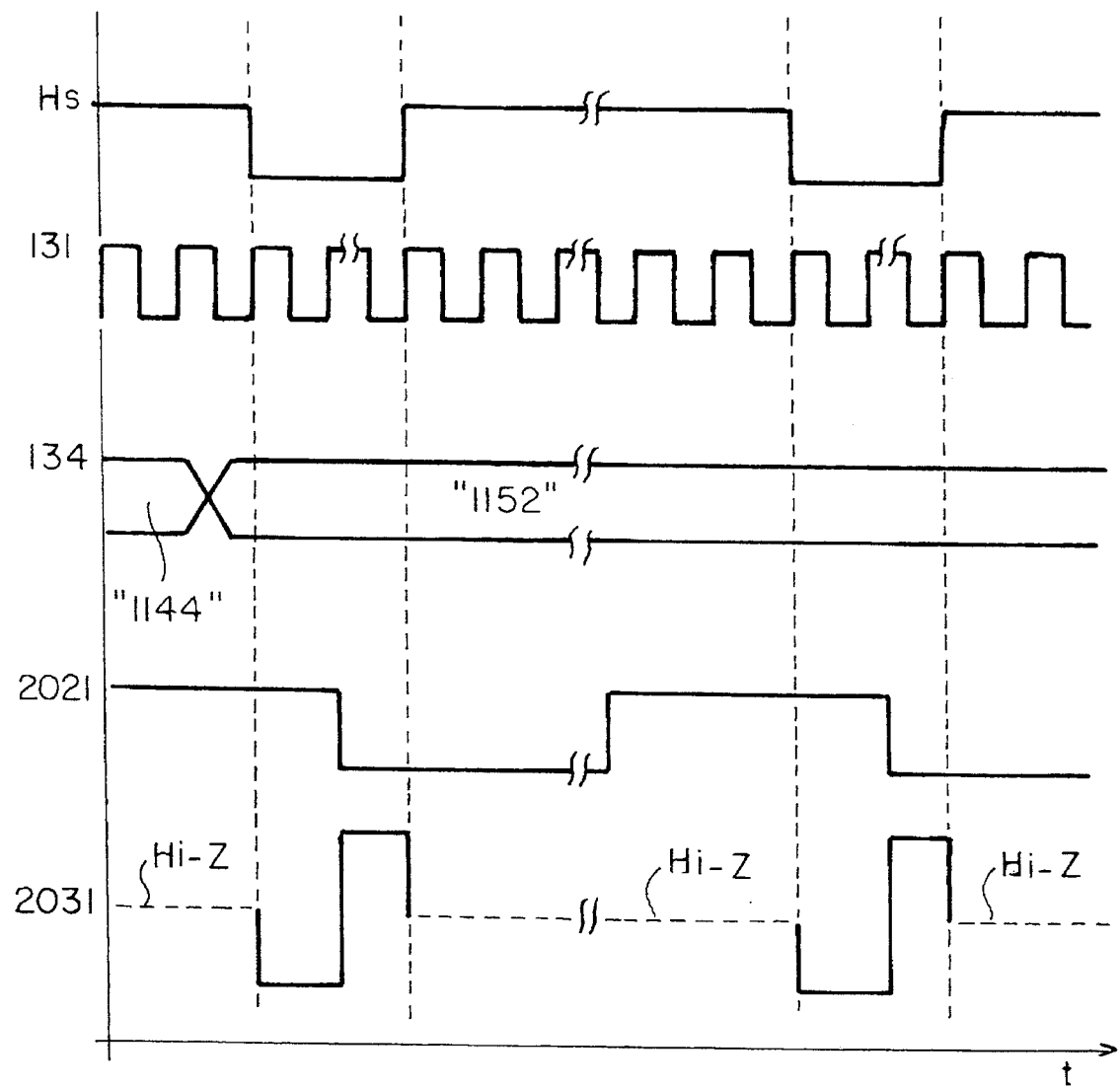
FIG. 4 is a timing chart showing an operation of the circuit shown in FIG. 2 when a frequency driving ratio is changed from a first value to a second value.

When the child picture image of the PAL method is supplied, the controller 140 changes the frequency dividing ratio data 134 from "1144" to "1152", as shown in FIG. 4. In response to the level-inversion edge of the frequency-divided signal 2021 from the high level to the low level, the frequency divider 202 fetches the new frequency dividing ratio (1152) starts to divide the clock signal output 131 at that frequency dividing ratio. Because the frequency dividing ratio is increased, the level-inversion edge of the frequency-divided signal 2021 in a next horizontal flyback period appears at a point deviated forward from the center of the low level period of the signal 401, as shown in FIG. 4. Accordingly, the charge pump circuit 203 charges the LPF 204 for a period of time longer than the discharging period, so that the output voltage level of the LPF 204 becomes high. The oscillation frequency of the VCO 201, i.e., the frequency of the clock signal 131 becomes high. When the frequency of the clock signal 131 is increased up to 21.4 MHz, the phase synchronized state is settled as shown in FIG. 3.

Figure 5:
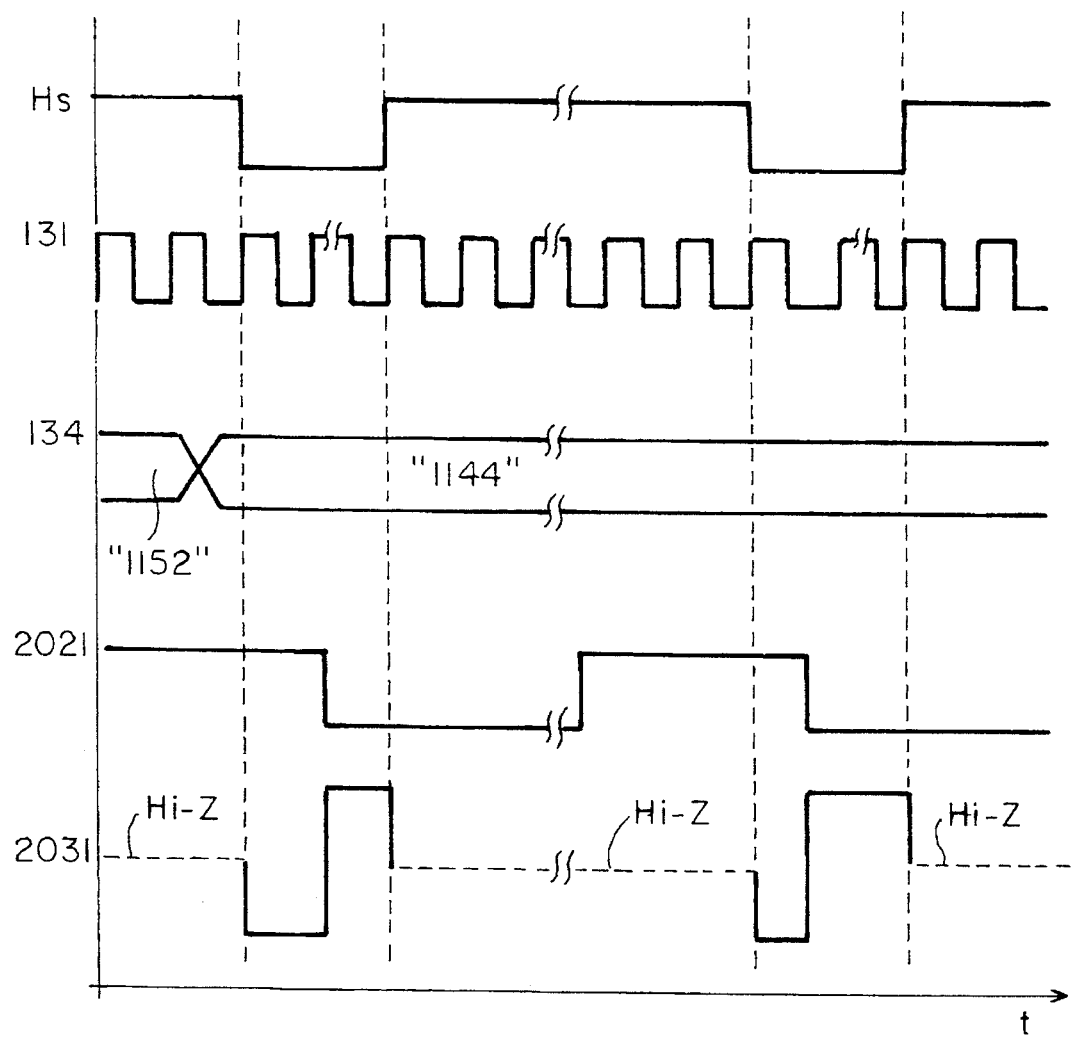
FIG. 5 is a timing chart showing an operation of the circuit shown in FIG. 2 when a frequency dividing ratio is changed from the second value to the first value.

On the other hand, when a child picture image of the NTSC method is supplied to a television set of the PAL system in which the frequency of the clock signal 131 is 24.1 MHz, the controller 140 changes the frequency dividing ratio date to be set into the programmable frequency divider 202 from "1152" to "1144", as shown in FIG. 5. As a result, the discharging period of the LPF 204 becomes longer than the charging period thereof as also shown in FIG. 5. The output voltage level of the LPF 204 is thus lowered to lower, the oscillation frequency of the VCO 201.

In the case where the television set is of the PAL type and the frequency of the clock signal 131 is 18 MHz, the frequency dividing ratio is changed from "1144" to "960" in response to a child picture image of the NTSC method. As a result, the oscillation frequency of the VCO 201 is changed from 18 MTz to 15.1 MHz.

In the above description, the parent and child picture images are defined as the NTSC and/or PAL system. However, the present invention is apparently applicable to other systems such as a case where an image is displayed on the basis of computer graphic processing. Further, it is possible to change the oscillation frequency of the oscillator 120 while keeping the oscillation frequency of the oscillator 130 constant, as mentioned previously. Further, instead of making the frequency of the frequency-divided signal 2021 the same as the frequency of the horizontal synchronizing signal Hs, it is possible to make it an integer multiple of the synchronizing signal frequency, so long as the inversion edge of the frequency-divided signal 2021 appears once during the low level period of the horizontal synchronizing signal Hs.

That is, the present invention is not limited to the above embodiments but may be modified and changed without departing from the scope and spirit of the invention.

What is claimed is:

1. An oscillator circuit comprising:

an oscillator oscillating to produce a clock signal having a frequency controlled by a control signal supplied thereto, a programmable frequency divider frequency-dividing said clock signal produced by said oscillator with a programmable frequency dividing rate and producing a frequency-divided signal, a charge pump circuit, receiving a horizontal synchronizing signal and said frequency-divided signal, said horizontal synchronizing signal having a level indicative of a horizontal flyback period, said charge pump circuit being activated during said level of the horizontal synchronizing signal indicative of the horizontal flyback period, and producing a charging/discharging current in response to a logical level of the frequency-divided signal supplied thereto during an activated period of said charge pump circuit, and means responsive to said charging/discharging current for producing said control signal, wherein said means comprises a low-pass filter, and wherein said charge pump circuit comprises a clocked inverter having a control terminal, an input terminal and an output terminal, the horizontal synchronizing signal and the frequency-divided signal being supplied to said control terminal and said input terminal, respectively, and said output terminal being connected to said low-pass filter.

2. A picture-in-picture system comprising:

means responsive to a first clock signal for generating digital data representative of compressed information of an image signal;

a memory for temporarily storing said digital data;

means responsive to a second clock signal for generating a compressed image signal by reading the digital data from said memory and converting it into an analog signal;

control means for producing control data;

a first oscillator generating one of said first and second clock signals;

a second oscillator generating the other of said first and second clock signals;

said first oscillator including means responsive to said control data from said control means for controlling said one of said first and second clock signals to have a first frequency when said control data assumes a first value and to have a second frequency when said control data assumes a second value;

said first oscillator comprising:

a voltage-controlled oscillator generating said one of said first and second clock signals, a frequency divider for dividing said one of said first and second clock signals to produce a frequency-divided signal, and means for changing an oscillation frequency of said voltage-controlled oscillator in response to a difference in phase between said frequency-divided signal and a horizontal synchronizing signal to thereby control the frequency of said one of said first and second clock signals;

said changing means comprising a clocked inverter having an input terminal supplied with said frequency-divided signal, a clock terminal supplied with said horizontal synchronizing signal and an output terminal, and a low-pass filter connected between said output terminal and said voltage-controlled oscillator.

3. An oscillator circuit comprising an oscillator oscillating to produce a clock signal having a frequency controlled by a control signal supplied thereto, a programmable frequency divider frequency-dividing said clock signal produced by said oscillator with a programmable frequency dividing ratio and producing a frequency-divided signal, a charge pump circuit receiving a horizontal synchronizing signal and said frequency-divided signal and producing a charging/discharging current at an output node thereof in response to a logic level of said frequency-divided signal when said horizontal synchronizing signal has a level indicative of a horizontal flyback period, said charge pump circuit including first and second transistors connected in series between a first power terminal and said output node, and third and fourth transistors connected in series between said output node and a second power terminal, said first and fourth transistors being rendered conductive during said level of said horizontal synchronizing signal indicative of the horizontal flyback period, said second transistor being rendered conductive when said frequency-divided signal assumes a first logic level, and said third transistor being rendered conductive when said frequency-divided signal assumes a second logic level; and means responsive to said charging/discharging current for producing said control signal.

4. The oscillator circuit as claimed in claim 3, wherein each of said first and second transistors is of a first channel type and each of said third and fourth transistor is of a second channel type, said first transistor receiving at a gate thereof said horizontal synchronizing signal, said fourth transistor receiving at a gate thereof an inverted signal of said horizontal synchronizing signal, and said second and third transistors receiving at gates thereof in common said frequency-divided signal.

\* \* \* \* \*